(12) United States Patent
Chubachi

(10) Patent No.: US 6,700,618 B1
(45) Date of Patent: Mar. 2, 2004

(54) AUTOMATIC FOCUS-DETECTING APPARATUS AND METHOD THEREOF

(75) Inventor: Sunao Chubachi, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/441,663

(22) Filed: Nov. 16, 1999

(30) Foreign Application Priority Data

Nov. 18, 1998 (JP) ............................................. 10-328567

(51) Int. Cl.⁷ .............................................. H04N 5/232
(52) U.S. Cl. ..................... 348/354; 348/345; 348/349
(58) Field of Search ................................ 348/345, 349, 348/353–356

(56) References Cited

U.S. PATENT DOCUMENTS 5,235,428 A * 8/1993 Hirota et al. ............... 348/355
5,539,462 A * 7/1996 Lee et al. ................... 348/349

OTHER PUBLICATIONS

Junichi Ishida, et al., "Auto–Focus Adjustment For A Television Camera In The Hill Climbing Servo System," NHK Technical Report, vol. 17, No. 1, (1965), pp. 21–37.

* cited by examiner

*Primary Examiner*—Andrew Christensen
*Assistant Examiner*—Dorothy Wu
(74) *Attorney, Agent, or Firm*—Oblon, Spivak, McClelland, Maier & Neustadt, P.C.

(57) ABSTRACT

A focus point detecting apparatus comprises a HPF which extracts a high-frequency component from a picked-up image, and an ABS circuit which obtains an absolute value of the outputs of the HPF. A base clipping circuit removes a component equal to or less than a first threshold value from the output of the ABS circuit, and an another base clipping circuit removes a component equal to or less than a second threshold value which is larger than the first threshold value from the output of the ABS circuit. An integrator integrates the output of one of the base clipping circuits and an another integrator integrates the output of the other base clipping circuit. Finally, a computing circuit detects a focus point according to the integrated values in the two integrators. Therefore, focus point can be detected with higher precision.

24 Claims, 13 Drawing Sheets

AUTOMATIC FOCUS-DETECTING APPARATUS AND METHOD THEREOF

FIELD OF THE INVENTION

The present invention relates to an automatic focus-detecting apparatus and method thereof. More particularly, this invention relates to an automatic focus-detecting apparatus applied in image input equipment having image pickup device used for a video camera or a digital camera.

BACKGROUND OF THE INVENTION

As an automatic focus-detector for a digital camera, there has been known a detector using a mountain climbing servo system ("Auto-focus adjustment for a television camera in the hill climbing servo system", Technical Report by NHK, 1965, Vol. 17, No. 1, Consecutive Vol. No. 86, Page 21).

The mountain climbing servo system is realized by successively scanning and reading the image signals from image pickup device. High-frequency components included in the image signals are then extracted and integrated. This process is repeated while changing a focusing point on the image pickup device. A point at which the integrated output is the maximum is determined as the focus point. Since the focus point is detected with the help of the image pickup device and the optical system for the device, there is no need to provide any other device or optical system for detecting the focus point. Thus, the mountain climbing servo system is an excellent system. Therefore, this system is still used in circuits in which filters for extracting high-frequency components included in an image signal or integrators for integrating the outputs from such filters are digitized.

FIG. 13 is a block diagram showing an example of an automatic focus-detecting circuit based on the conventional technology with the mountain climbing servo system employed therein. In this figure, the reference numeral 301 shows a HPF (High-pass filter) which passes therethrough only high-frequency components included in input image data. Herein, output of the HPF 301 may have a positive or a negative polarity. The reference numeral 302 shows an ABS circuit (Absolute value circuit) which computes an absolute value of the output of the HPF 301. The reference numeral 303 shows a base clipping circuit which removes the output lower than a prespecified level from the output of the ABS circuit 302. The reference numeral 304 shows an integrator which integrates the output of the base clipping circuit 303 for each image. The reference numeral 305 shows a computing circuit which temporarily stores therein the output of the integrator 304, and compares the output of the integrator 304 at a plurality of locations to determine a focus.

Operation of the automatic focus-detecting circuit in FIG. 13 is explained below. The HPF 301 extracts high-frequency components from image data input at each lens position (focusing point) when the lens is shifted to output the high-frequency components to the ABS circuit 302. The ABS circuit 302 obtains an absolute value of the output (this output may have a positive or a negative polarity) of the HPF 301 and outputs the absolute value to the base clipping circuit 303.

The base clipping circuit 303 removes components lower than the prespecified level, namely removes the components which is most probably the noise from the output of the ABS circuit 302 and outputs the rest of the components to the integrator 304. The integrator 304 integrates components included in a preset focal-point detection range in the image data of the output of the base clipping circuit 303, and outputs the integrated component to the computing circuit 305 for each image. The computing circuit 305 compares the output of the integrator 304 at each lens position (focusing point) with each other, and outputs the position at which the value is the maximum as a focus point.

In the conventional type of automatic focus-detecting circuit, however, malfunction may occur with an image including a highly bright object like a light source because integrated output becomes the maximum not at a point at which focussed but at a point at which the focus does not match. In an ordinary image, when an object is out of focus and vague, the output of the image signal in that portion becomes weak. Therefore, the extracted high-frequency component in each pixel becomes smaller, and hence the integrated output becomes smaller than that of the focused point. However, in an image including a highly bright object, even if the object is out of focus, the output is not lower than that of the focused point because an image signal of the such an object is saturated or close to saturation. As a result, the extracted high-frequency component in each pixel does not become smaller. The reason behind this is that the integrated output for the portion of the highly bright object being out of focus and vague is larger than that for a focused point by the defocused amount.

SUMMARY OF THE INVENTION

The present invention has been made in light of the problems described above. It is an object of this invention to provide an automatic focus-detecting apparatus and method thereof enabling detection of a focus with high precision even when a highly bright object is included in the image.

According to a first aspect of this invention, a high-frequency component extracting unit extracts a high-frequency component included in the picked-up image, the first clipping unit removes a component equal to or less than the first threshold value from the high-frequency component and outputs the rest of the high-frequency component, a second clipping unit removes a component equal to or less than the second threshold value which is larger than the first threshold value from the high-frequency component and outputs the rest of the high-frequency component, a first integrating unit integrates the output of the first clipping unit, a second integrating unit integrates the output of the second clipping unit, and a computing unit detects the focus point according to the integrated values obtained in the first and the second integrating unit. Therefore, the focus point can be detected with high precision even for an object containing a highly bright object.

According to a second aspect of this invention, a high-frequency component extracting unit extracts a high-frequency component included in the picked-up image, a first clipping unit removes a component equal to or less than a first threshold value from the high-frequency component to output the rest of the high-frequency component, a second clipping unit removes a component equal to or less than a second threshold value which is larger than the first threshold value from the high-frequency component to output the rest of the high-frequency component, a first integrating unit integrates the output of the first clipping unit, a second integrating unit integrates the output of the second clipping unit, a highly bright object detecting unit detects a high-brightness component in a picked-up image, and a computing unit detects the focus point according to the integrated values obtained in the first and second integrating unit and the result of detection in the highly bright object detecting unit. Therefore, it is possible to detect the focus point with high precision even for an object containing a highly bright object.

According to a third aspect of this invention, a high-frequency component extracting unit extracts a high-frequency component included in the picked-up image, a clipping unit removes a component equal to or less than a first threshold value from the high-frequency component and outputs the rest of the high-frequency component, a comparing unit outputs a comparison signal when the high-frequency component is equal to or higher than a second threshold value which is larger than the first threshold value, an integrating unit integrates the output of the clipping unit, a counter counts the output of the comparing unit, and a computing unit detects the focus point according to the integrated value obtained in the integrating unit and the counted value obtained in the counting unit. Therefore, it is possible detect the focus point with high precision even for an object containing a highly bright object.

According to a forth aspect of this invention, a high-frequency component extracting unit extracts a high-frequency component included in the picked-up image, a clipping unit removes a component equal to or less than a first threshold value from the high-frequency component and outputs the rest of the high-frequency component, a comparing unit outputs a comparison signal when the high-frequency component is equal to or higher than a second threshold value which is larger than the first threshold value, an integrating unit integrates the output of the clipping unit, a counting unit counts the output of the comparing unit, a highly bright object detecting unit detects a high-brightness component in the picked-up image, and a computing unit detects the focus point according to the integrated value obtained the integrating unit, the counted value obtained in the counting unit, and the result of detection in the highly bright object detecting unit. Therefore, it is possible to detect the focus point with high precision even for an object containing a highly bright object.

Other objects and features of this invention will become apparent from the following description with reference to the accompanying drawings.

DESCRIPTION OF THE PREFERRED EMBODIMENTS

The preferred embodiments of the present invention will be described where the automatic focus-detecting apparatus and method thereof according to the present invention is applied in a digital still camera with reference to the attached drawings.

Figure 1:
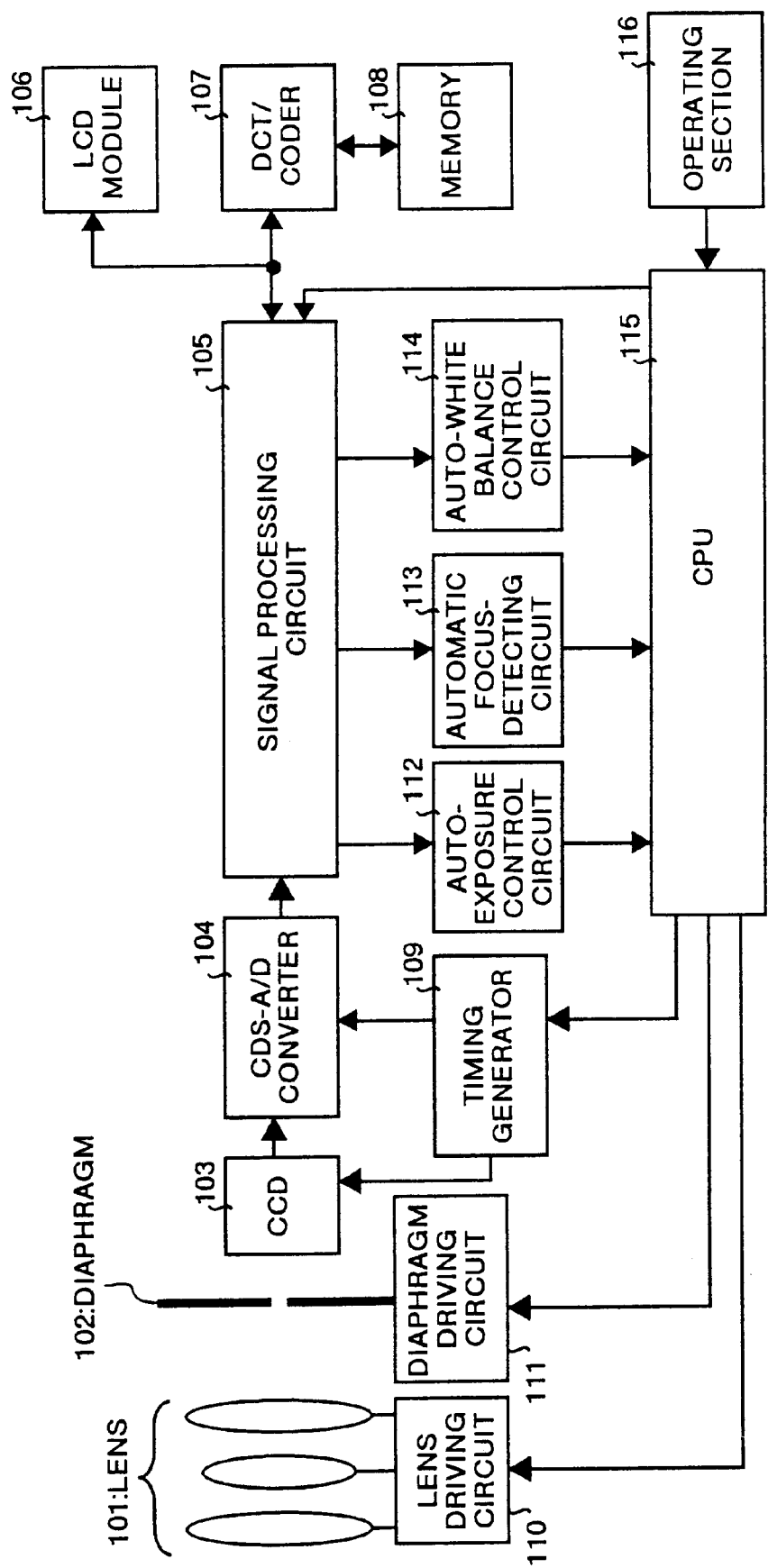
FIG. 1 is a block diagram showing configuration of a digital still camera with an automatic focus-detecting apparatus according to the present invention applied therein.

FIG. 1 is a block diagram showing configuration of a digital still camera according to the embodiment of the present invention. In this figure, the reference numeral 101 shows a lens that forms an image of an object. The reference numeral 102 shows a diaphragm which restricts the light quantity passing through the lens 101. The reference numeral 103 shows a CCD which converts an image of the object to an electric signal and output the signal as image data. The reference numeral 104 shows a CDS-A/D converter which removes a noise component included in an output signal of the CCD 103 to amplify the signal component, and converts the shaped and amplified analog signal to a digital signal. The reference numeral 105 shows a signal processing circuit which executes image processing such as pixel interpolation, gain correction, γ-correction, aperture correction for each color. The reference numeral 106 shows an LCD module which displays data for the photographed image and also reproduces and displays the image data stored in a memory 108.

The reference numeral 107 shows a DCT/coder for compressing/decompressing image data. The reference numeral 108 shows the memory which stores the image data. The reference numeral 109 shows a timing generator which generates pulses for driving the CCD 103 and CDS-A/D converter 104. The reference numeral 110 shows a lens driving circuit which drivers the lens 101 with the help of a motor or a solenoid to shift a focusing point of an image to be formed on the CCD 103. The reference numeral 111 shows a diaphragm driving circuit which changes the aperture of the diaphragm 102 with the help of a solenoid or the like. The reference numeral 112 shows an auto-exposure control circuit which controls the automatic exposure (AE). The reference numeral 113 shows an automatic focus (AF)-detecting circuit which detects a focus of an image to be picked-up. The reference numeral 114 shows an auto-white balance (AWB) control circuit which automatically adjusts the white balance. The reference numeral 115 shows a CPU which controls the operation of each section of the digital still camera. The reference numeral 116 shows an operating section having a shutter button and mode keys or the like for setting various modes. Pressing the shutter button halfway, the processing for displaying an image onto the LCD module 106 and determining photographing conditions such as AE, AF, and AWB is performed. Further, by pressing the shutter button full the image is recorded on the memory 108.

Operation of recording an image in the digital still camera in FIG. 1 is explained here. A power button not shown therein is turned ON to effect image record mode by operating the operating section 116. In this condition, when the shutter button of the operating section 116 is half-pressed, quantity of light passing through the lens 101 is adjusted in the diaphragm 102, and an image of an object is formed on the CCD 103. The CCD 103 converts the image to an electric signal according to light quantity detected by each pixel and outputs the signal to the CDS-A/D converter 104 as image data at each prespecified time interval. The CDS-A/D converter 104 removes a noise component from the image data (analog signal), amplifies the image data without the noise component, and then converts the data to digital data. Herein image data has data for colors of color filters formed on a photoreceptor of the CCD 103 such as R, G, B or Ye, Cy, Mg, and G for each pixel.

In the signal processing circuit 105, the image data is interpolated between pixels (when color filters of the CCD 103 are ones other than R, G, and B, conversion to R, G, and B may be executed), separated into each color component of R, G, and B for each pixel, and subjected to image processing such as gain correction, γ-correction, aperture correction for each color, and further converted to a brightness signal (Y) and a color difference signal (U, V) to be output to the LCD module 106. A monitor image recorded by the digital still camera is displayed on the LCD module 106. The monitor image is updated at a prespecified time interval.

Furthermore, output of the signal processing circuit 105 is input also into the auto-exposure control circuit 112, automatic focus-detecting circuit 113, and auto-white balance control circuit 114. These auto-exposure control circuit 112, automatic focus-detecting circuit 113, and auto-white balance control circuit 114 are used for determining photographic conditions before taking a photograph when the shutter button is half-pressed.

Input into the auto-exposure control circuit 112 from the signal processing circuit 105 is image data obtained by converting a signal for each color of R, G, and B in each pixel to a brightness signal. The auto-exposure control circuit 112 computes an amount of light exposure of the CCD 103 within a preset area in the inputted image data and outputs a result of computation to the CPU 115. In accordance with the result of computation, the CPU 115 changes a gain of the amplifier in the CDS-A/D converter 104, operates the diaphragm driving circuit 111, and furthermore changes the speed of the electronic shutter of the CCD 103 through the timing generator 109 so that the amount of light exposure in the CCD 103 will be appropriate. With this operation, auto-exposure control is effected.

Input into the automatic focus-detecting circuit 113 from the signal processing circuit 105 is image data obtained by converting a signal for each color of R, G, and B for each pixel to a brightness signal. The automatic focus-detecting circuit 113 computes an amount of high-frequency components included in the input image data within a preset area in the image data.

The automatic focus-detecting circuit 113 performs the operation described above at many focusing points by shifting the focusing point of an image to be formed on the CCD 103 from the Infinity toward the minimum range (and vice versa) with the lens 101 driven by the lens driving circuit 110. The automatic focus-detecting circuit 113 determines the focusing point at which a result of computation is the maximum as a focus point and outputs the data corresponding to this focus point to the CPU 115. The CPU 115 makes the lens driving circuit 110 operate to drive the lens 101 to the position of the input focus point.

Input into the auto-white balance control circuit 114 from the signal processing circuit 105 is image data for a signal for each color of R, G, and B in each pixel. The auto-white balance control circuit 114 computes color deviation of the inputted image from color distribution of R, G, and B in the inputted image data within a preset area in the input image data and outputs a result of computation to the CPU 115. The CPU 115 changes a gain of gain correction for each color in the signal processing circuit 105 so that color deviation will be corrected.

After the photographic conditions are determined in the auto-exposure control circuit 112, automatic focus-detecting circuit 113, and auto-white balance control circuit 114 (the operator usually notices it with lighting of an LED not shown in the figure), and an image is picked up when the shutter button of the operating section 116 is fully pressed. The image data obtained via the lens 101, diaphragm 102, CCD 103, CDS-A/D converter 104, and signal processing circuit 105 is compressed by the DCT/coder 107 and stored in the memory 108.

Example 1 to Example 8 of the configuration of the above mentioned automatic focus-detecting circuit 113 will be described with reference to FIG. 2 to FIG. 11.

Figure 2:
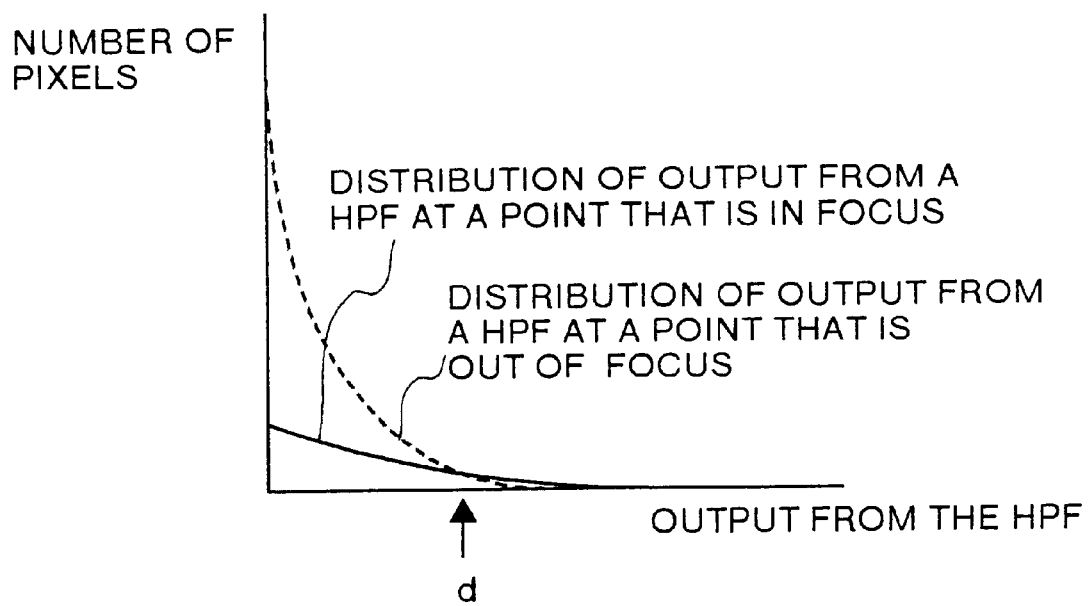
FIG. 2 is a view showing an example of output distribution from a HPF for an automatic focus-detecting circuit.

In the present invention, attention has been given to distribution of output of a HPF in the automatic focus-detecting circuit. FIG. 2 shows an example of output distribution of the HPF. This figure especially shows a distribution of each level of high-frequency components extracted at a point that is in focus and at a point that is out of focus within a focal-point detection range in an image including a highly bright object in which integrated output is maximum at the point that is out of focus. As shown in FIG. 2, it is clear that, in the distribution of high-frequency components extracted at a value higher than a certain value (d in FIG. 2), output of the HPF at the point in focus is higher than that at the point out of the focus.

EXAMPLE 1

Figure 3:
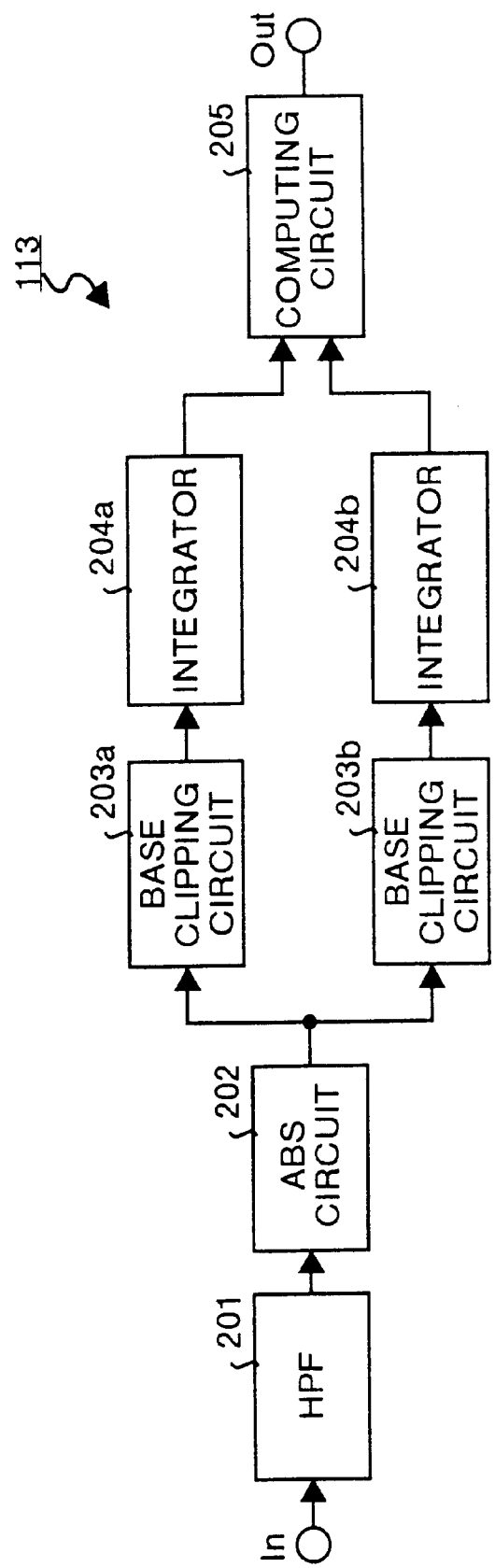
FIG. 3 is a block diagram showing Example 1 of the configuration of the automatic focus-detecting circuit in FIG. 1.
Figure 4A:
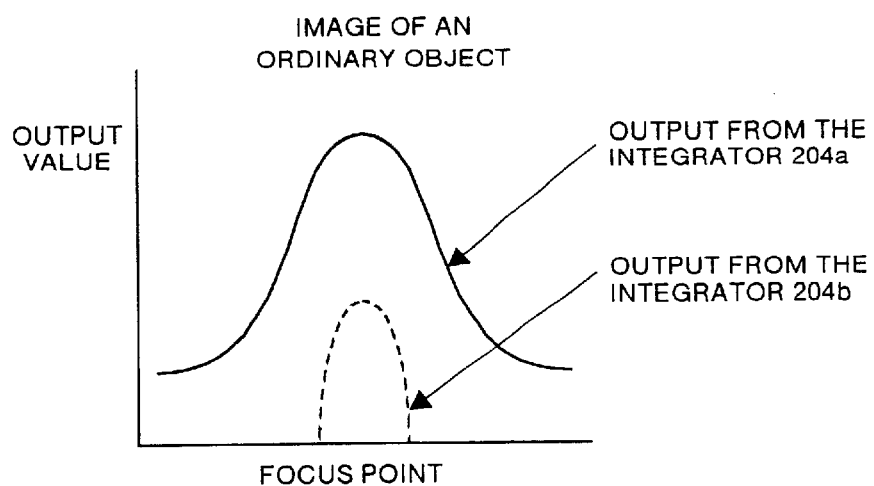
FIG. 4A to FIG. 4C are views each showing output characteristics of integrators of the automatic focus-detecting circuit in FIG. 3.
Figure 4B:
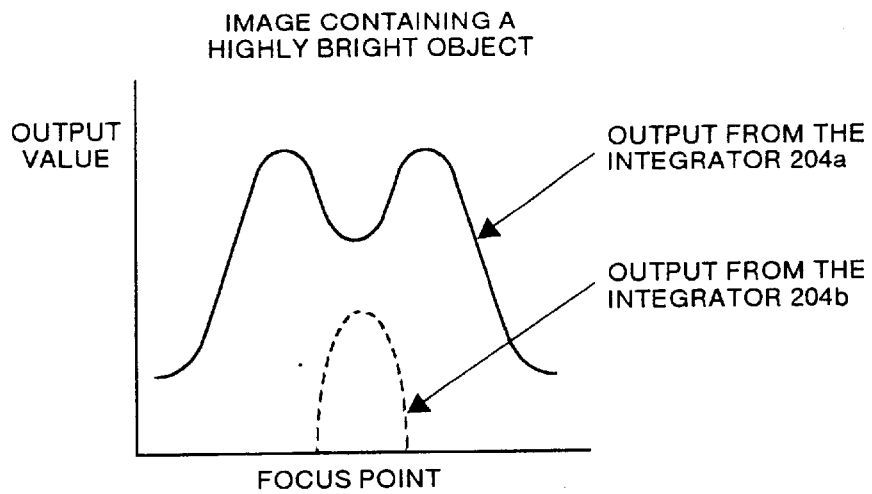
Figure 4C:
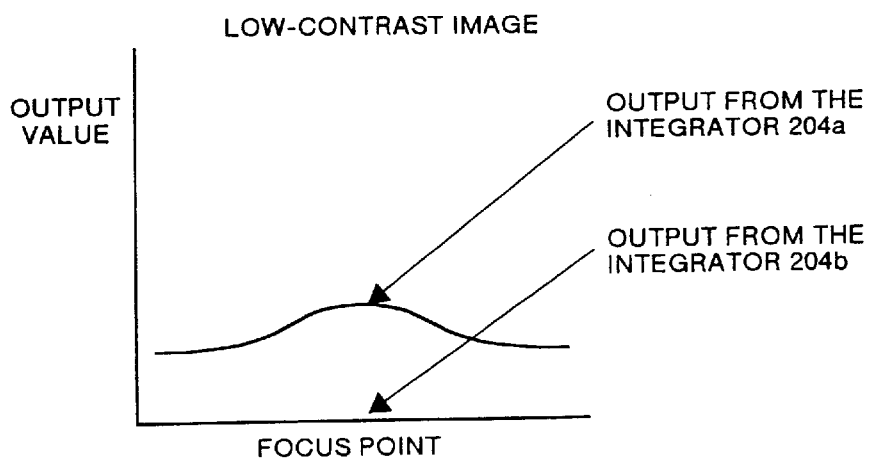

FIG. 3 is a block diagram showing Example 1 of the configuration of the above mentioned automatic focus-detecting circuit 113. FIG. 4A to FIG. 4C are views showing output characteristics of integrators 204a, 204b in the automatic focus-detecting circuit 113 shown in FIG. 3.

In FIG. 3, the reference numeral 201 shows a HPF (High-pass filter) which passes only a high-frequency component included in an input image. The reference numeral 202 shows an ABS circuit (Absolute value circuit) which calculates an absolute value of the output (this output may have a positive or a negative polarity) of the HPF 201. The reference numerals 203a, 203b show base clipping circuits each of which remove a component equal to or less than a threshold value of output of the ABS circuit 202. A threshold value Tb in the base clipping circuit 203b is set to a larger value as compared to a threshold value Ta of the base clipping circuit 203a (Tb>Ta).

The reference numerals 204a, 204b show integrators for which integrate output of the base clipping circuits 203a, 203b for each image (image at each lens position) respectively. The reference numeral 205 shows a computing circuit which temporarily stores the outputs of the integrators 204a, 204b, computes the points where each output of the integrators 204a, 204b is the maximum, and outputs the focusing point at which output of either the integrator 204a or 204b is the maximum to the CPU 115 as a focused point.

Operation of the automatic focus-detecting circuit 113 in FIG. 3 is described below. The HPF 201 extracts a high-frequency component from the input image data and outputs it to the ABS circuit 202. The ABS circuit 202 obtains an absolute value of the output (this output may have a positive or a negative polarity) of the HPF 201 and outputs the absolute value to the base clipping circuits 203a, 203b.

The base clipping circuit 203a removes a component (which is most likely the noise) equal to or less than the threshold value Ta from the output of the ABS circuit 202 and outputs the rest to the integrator 204a. The base clipping circuit 203b removes a component equal to or less than the threshold value Tb (Tb>Ta) from the output of the ABS circuit 202 and outputs the rest to the integrator 204b.

The integrators 204a, 204b integrate components included in a preset focal-point detection range in the image data of each output of the base clipping circuits 203a, 203b, and output each integrated value to the computing circuit 205 for each image.

Herein, when an image of an ordinary object is picked up, changes in each level of outputs of the integrators 204a, 204b according to each focusing point are as shown in FIG. 4A. In the case of the ordinary object, points where each output of the integrators 204a, 204b is the maximum are coincident with each other, and the computing circuit 205 outputs the point at which the output is the maximum to the CPU 115 as a focus point.

When the image contains a highly bright object, changes in each level of outputs of the integrators 204a, 204b according to each focusing point are as shown in FIG. 4B. The points where each output of the integrator 204a and the integrator 204b is the maximum are not coincident with each other. The maximum value of the integrator 204a in this case is obtained under the situation that a light source within a focal-point detection range is defocused to become artificially large, thus the computing circuit 205 outputs the point at which the output of the integrator 204b is the maximum to the CPU 115 as a focus point.

When a low-contrast image is picked up, changes in each level of outputs of the integrators 204a, 204b according to each focusing point are as shown in FIG. 4C. The value of the output of the integrator 204b is zero as shown in the same figure. In this case, the computing circuit 205 outputs the point at which the output of the integrator 204a is the maximum to the CPU 115 as a focus point.

As described above, with Example 1 of the configuration, the base clipping circuit 203a removes a component equal to or less than a first threshold value Ta of output of the ABS circuit 202 and outputs the rest, the base clipping circuit 203b removes a component equal to or less than a second threshold value Tb, which is larger as compared to the first threshold value Ta, of output of the ABS circuit 202 and output the rest. Further, the integrator 204a integrates the output of the base clipping circuit 203a to compute an integrated value, the integrator 204b integrates the output of the base clipping circuit 203b to compute an integrated value. Finally, the computing circuit 205 detects a focus point according to the integrated values of the integrators 204a and 204b. Therefore, it is possible to detect a focus point with high precision even for an object containing a highly bright object based on simple and small-scale circuit configuration.

EXAMPLE 2

Figure 5:
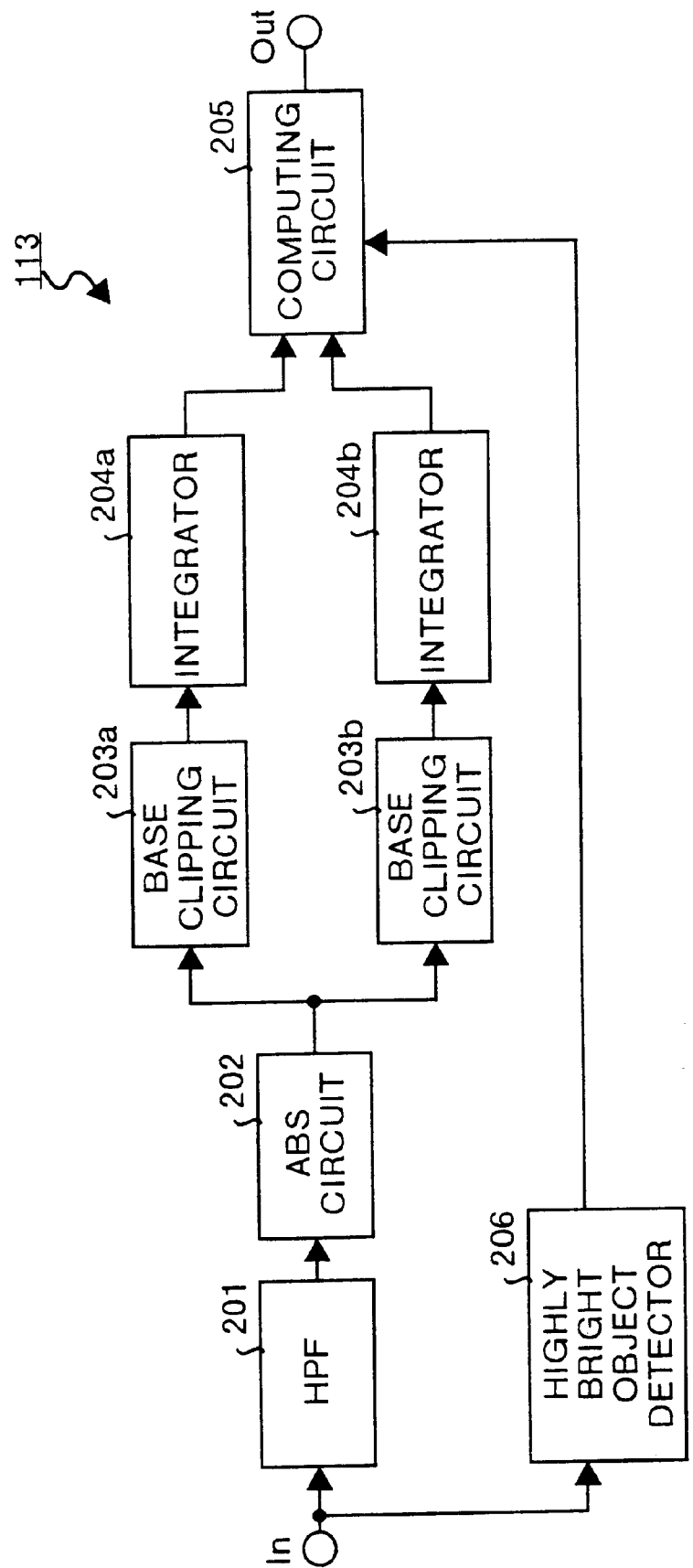
FIG. 5 is a block diagram showing Example 2 of the configuration of the automatic focus-detecting circuit in FIG. 1.

FIG. 5 is a block diagram showing Example 2 of the configuration of the automatic focus-detecting circuit 113. In this figure, the same reference numerals are assigned to the components corresponding to those in FIG. 3.

In FIG. 5, the reference numeral 201 shows a HPF (High-pass filter) which passes only a high-frequency component included in an input image. The reference numeral 202 shows an ABS circuit (Absolute value circuit) which calculates an absolute value of the output (this output may have a positive or a negative polarity) of the HPF 201. The reference numerals 203a, 203b show base clipping circuits each of which remove a component equal to or less than a threshold value of output of the ABS circuit 202. A threshold value Tb in the base clipping circuit 203b is set to a larger value as compared to a threshold value Ta of the base clipping circuit 203a (Tb>Ta).

The reference numerals 204a, 204b show integrators which integrate output of the base clipping circuits 203a, 203b for each image (image at each lens position) respectively. The reference numeral 206 shows a highly bright object detector for detecting a high-brightness component included in an input image, which changes an output level, for instance, when a signal at a level higher than a level preset by a comparator is input and maintains the status until an operation of focal-point detection is finished. The reference numeral 205 shows a computing circuit, which temporarily stores the output of the integrators 204a, 204b, computes focusing points where each output of the integrators 204a, 204b is the maximum, and outputs the focusing point at which output of either the integrator 204a or 204b is the maximum according to the status of output of the highly bright object detector 206 to the CPU 115 as a focused point.

Operation of the automatic focus-detecting circuit 113 in FIG. 5 is described below. The HPF 201 extracts a high-frequency component from the input image data and outputs it to the ABS circuit 202. The ABS circuit 202 obtains an absolute value of the output (this output may have a positive or a negative polarity) of the HPF 201, and outputs the data to the base clipping circuits 203a, 203b.

The base clipping circuit 203a removes a component (which is most likely the noise) equal to or less than the threshold value Ta from the output of the ABS circuit 202 and outputs the rest to the integrator 204a. The base clipping circuit 203b removes a component equal to or less than the threshold value Tb (Tb>Ta) from output of the ABS circuit 202 and outputs the rest to the integrator 204b.

The integrators 204a, 204b integrate components included in a preset focal-point detection range in the image data of each output of the base clipping circuits 203a, 203b, and output each integrated value to the computing circuit 205 for each image.

The computing circuit 205 computes points where each output of the integrators 204a, 204b at a plurality of points is the maximum, and outputs the point at which output of either the integrator 204a or integrator 204b is the maximum according to a state of output of the highly bright object detector 206 to the CPU 115 as a focus point. More specifically, the computing circuit 205 determines the focus point as described below.

When the highly bright object detector 206 does not detect a highly bright object in the input image, namely, when an image of an ordinary object is picked up, changes in each level of outputs of the integrators 204a, 204b according to each focusing point are as shown in FIG. 4A. When a low-contrast image is picked up the computing circuit 205 outputs the point at which the output of the integrator 204a is the maximum to the CPU 115 as a focus point in the same manner as that in the above-mentioned Example 1. In the case of the ordinary object, as shown in this figure, points where each output of the integrators 204a, 204b is the maximum are coincident with each other, and the computing circuit 205 outputs the point at which the output is the maximum to the CPU 115 as the focus point.

When the highly bright object detector 206 detects a highly bright object in the input image, changes in each level of outputs of the integrators 204a, 204b according to each focusing point are as shown in FIG. 4B. When a highly bright object is present in the image, as shown in this figure, points where each output of the integrator 204a and integrator 204b is the maximum are not coincident with each other. The maximum value of the integrator 204a in this case is obtained under the situation that a light source within a focal-point detection range is defocused to become artificially large, thus the computing circuit 205 outputs the point at which the output of the integrator 204b is the maximum to the CPU 115 as the focus point.

As described above, with Example 2 of the configuration, the base clipping circuit 203a removes a component equal to or less than a first threshold value Ta of output of the ABS circuit 202 and outputs the rest, the base clipping circuit 203b removes a component equal to or less than a second threshold value Tb, which is larger as compared to the first threshold value Ta, of output of the ABS circuit 202 to output the rest. Further, the integrator 204a integrates the output of the base clipping circuit 203a to compute an integrated value, the integrator 204b integrates the output of the base clipping circuit 203b to compute an integrated value. Furthermore, the computing circuit 205 detects a focus point according to the integrated values of the integrator 204a and integrator 204b as well as according to a result of detection in the highly bright object detector 206. Therefore, it is possible to detect a focus point with high precision even for an image containing a highly bright object.

EXAMPLE 3

Figure 6:
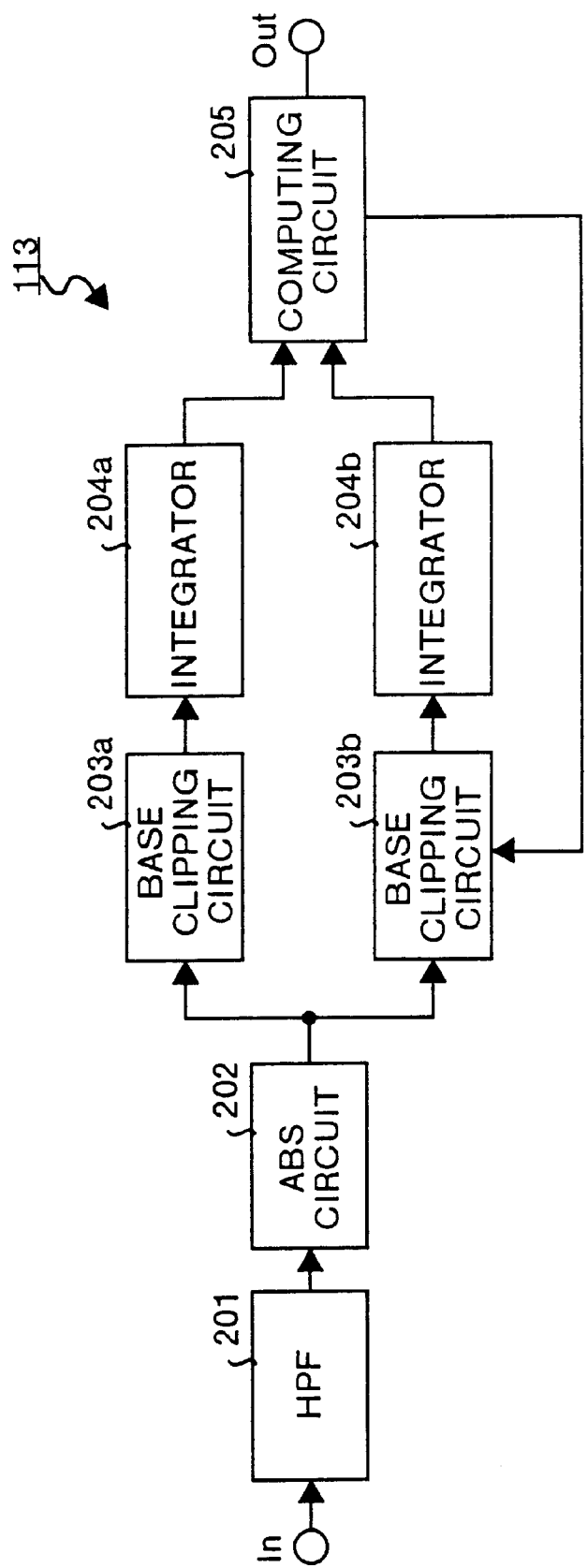
FIG. 6 is a block diagram showing Example 3 of the configuration of the automatic focus-detecting circuit in FIG. 1.

FIG. 6 is a block diagram showing Example 3 of the configuration of the automatic focus-detecting circuit 113. In this figure, the same reference numerals are assigned to the components corresponding to those in FIG. 3. Example 3 shown in FIG. 6 is different in a point that the computing circuit 205 can control the threshold value Tb in the base clipping circuit 203b in the configuration (Example 1) of FIG. 3.

Namely, in Example 3 of the configuration, when the maximum value of the integrator 204b is larger than a pre-set value at the time of picking up an image containing a highly bright object, the threshold value Tb in the base clipping circuit 203b is increased. By doing so, a lower limit of a target for computation of the base clipping circuit 203b is increased upping and an operation of focal-point detection is performed again. Thus, the precision of focal-point detection is enhanced because of the less influence of the highly bright object over output of the integrator 204b.

If the image is an ordinary object in which focusing points where each output of the integrators 204a, 204b is the maximum are coincident with each other, or when the maximum value of output of the integrator 204b is smaller than an upper limit_RH of a set range (RL to RH) in an image containing a highly bright object in which focusing points where each output of the integrators 204a, 204b is the maximum are not coincident with each other, the focus point is determined in the same manner as that in the above mentioned Example 1. Further, if the image is a low-contrast image, then the focus point is determined in the same manner as that in the above mentioned Example 1.

On the contrary, when an image contains a highly bright object in the case of which focusing points where each output of the integrators 204a, 204b is the maximum are not coincident with each other and if the maximum value of the output of the integrator 204b is larger than the upper limit RH of the set range (RL to RH), the computing circuit 205 increases the threshold value Tb in the base clipping circuit 203b and also outputs a retry signal for requesting a retry of focal-point detection to the CPU 115.

When receiving such a retry signal, the CPU 115 makes the related blocks operate to perform the operation of focal-point detection again. The same operation is repeated until the maximum value of output of the integrator 204b becomes smaller than the upper limit RH of the set range (RL to RH).

The computing circuit 205 outputs a point at which output of the integrator 204b is the maximum to the CPU 115 as the focus point when the maximum value of output of the integrator 204b becomes smaller than the upper limit RH of the set range (RL to RH) after increasing the threshold value Tb in the base clipping circuit 203b.

When the maximum value of output of the integrator 204b becomes smaller than the lower limit RL of the set range (RL to RH) after increasing the threshold value Tb in the base clipping circuit 203b, the computing circuit 205 decreases the threshold value Tb in the base clipping circuit 203b (an amount of decrease in the threshold value is made smaller than the amount that was increased in the immediately previous step) and also outputs a retry signal for requesting a retry of focal-point detection to the CPU 115. When receiving the retry signal, the CPU 115 makes the related blocks operate to perform the operation of focal-point detection again. The same operation is repeated until the maximum value of output of the integrator 204b exceeds the lower limit RL of the set range (RL to RH).

A method in which the maximum value of the integrator 204b is decreased, when the maximum value of output of the integrator 204b is greater than the upper limit RH of the set range (RL to RH), by increasing the threshold value of the base clipping circuit 203b to operate focal-point detection again and precision of focal-point detection is further enhanced when the maximum value of output of the integrator 204b is large is explained.

When the maximum value of the output of the integrator 204b is smaller than the upper limit RH of the set range (RL to RH), the focus point is determined in the same manner as that of the automatic focus-detecting circuit according to Example 1.

On the contrary, when the maximum value of output of the integrator 204b is greater than the upper limit RH of the set range (RL to RH), the computing circuit 205 increases the threshold value Tb in the base clipping circuit 203b and also outputs a retry signal for requesting a retry of focal-point detection to the CPU 115.

When receiving such a retry signal, the CPU 115 makes the related blocks operate to perform the operate on of focal-point detection again. The same operation is repeated until the maximum value of output of the integrator 204b becomes lower than the upper limit RH of the set range (RL to RH).

The computing circuit 205 outputs a point at which output of the integrator 204b is the maximum to the CPU 115 as the focus point when the maximum value of output of the integrator 204b becomes lower than the upper limit RH of the set range (RL to RH) after increasing the threshold value Tb in the base clipping circuit 203b.

When the maximum value of output of the integrator 204b becomes lower than the lower limit RL of the set range (RL to RH) after increasing the threshold value Tb in the base clipping circuit 203b, the computing circuit 205 decreases the threshold value Tb in the base clipping circuit 203b (an amount of decrease in the threshold value is made smaller than the amount that was increased in the immediately previous step) and also outputs a retry signal for requesting a retry of focal-point detection to the CPU 115. When receiving such a retry signal, the CPU 115 makes the related blocks operate to perform the operation of focal-point detection again. The same operation is repeated until the maximum value of output of the integrator 204b becomes greater than the lower limit RL of the set range (RL to RH).

When the maximum value of output of the integrator 204b is smaller than the lower limit RL of the set range (RL to RH) even after decreasing the threshold value Tb in the base clipping circuit 203b up to a certain value (the lowest limit of the threshold value) different from a set value to the integrator 204b, the computing circuit 205 outputs the point at which output of the integrator 204a is the maximum to the CPU 115 as the focus point.

As described above, with Example 3 of the configuration, the computing circuit 205 according to Example 1 can detect the focus point with higher precision by making the second threshold value Tb in the base clipping circuit 203b changeable and continuously performing an operation of focal-point detection until the maximum value of an integrated value obtained from the integrator 204b falls within the set range (RL to RH).

EXAMPLE 4

Figure 7:
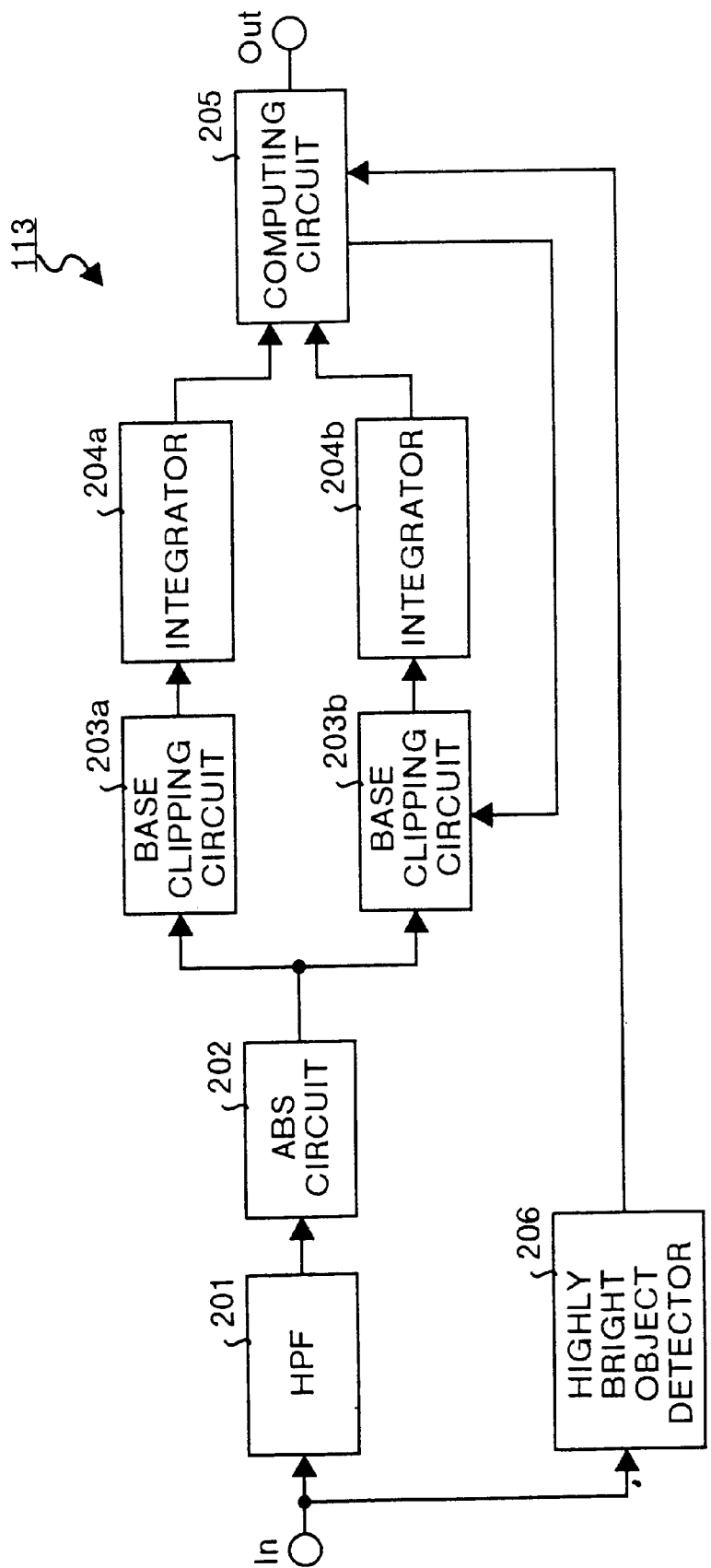
FIG. 7 is a block diagram showing Example 4 of the configuration of the automatic focus-detecting circuit in FIG. 1.

FIG. 7 is a block diagram showing Example 4 of the configuration of the automatic focus-detecting circuit 113. In this figure, the same reference numerals are assigned to the components corresponding to those in FIG. 5. Example 4 shown in FIG. 7 is different in a point that the computing circuit 205 can change the threshold value Tb in the base clipping circuit 203b in the configuration (Example 2 of the configuration) of FIG. 5.

In Example 4 of the configuration, when the maximum value of output of the integrator 204b is larger than the upper limit RH of the set range (RL to RH) at the time of picking up an image containing a highly bright object, the threshold value Tb in the base clipping circuit 203b is increased. By doing so, a lower limit of a target for computation of the integrator 204b is increased and an operation of focal-point detection is performed again. Thus, the precision of focal-point detection is enhanced because of the less influence of the highly bright object over output of the integrator 204b.

When a highly bright object is not detected in the highly bright object detector 206, or when the maximum value of output of the integrator 204b is smaller than the upper limit RH of the set range (RL to RH) even if a highly bright object is detected in the highly bright object detector 206, a focus point is determined in the same manner as that in Example 2.

On the contrary, when a highly bright object is detected in the highly bright object detector 206 and further the maximum value of output of the integrator 204b is larger than the upper limit RH of the set range (RL to RH), the computing circuit 205 increases the threshold value Tb in the base clipping circuit 203b and also outputs a retry signal for requesting a retry of focal-point detection to the CPU 115.

When receiving such a retry signal, the CPU 115 makes the related blocks operate to perform the operation of focal-point detection again. The same operation is repeated until the maximum value of output of the integrator 204b becomes smaller than the upper limit RH of the set range (RL to RH).

The computing circuit 205 outputs a point at which output of the integrator 204b is the maximum after increasing the threshold value Tb in the base clipping circuit 203b to the CPU 115 as the focus point.

When the maximum value of output of the integrator 204b becomes smaller than the lower limit RL of the set range (RL to RH) after increasing the threshold value Tb in the base clipping circuit 203b, the computing circuit 205 decreases the threshold value Tb in the base clipping circuit 203b (an amount of decrease in the threshold value is made smaller than the amount that was increased in the immediately previous step) and also outputs a retry signal for requesting a retry of focal-point detection to the CPU 115. When receiving the retry signal, the CPU 115 makes the related blocks operate to perform the operation of focal-point detection again. The same operation is repeated until the maximum value of output of the integrator 204b exceeds the lower limit RL of the set range (RL to RH).

As described above, with Example 4 of the configuration, the computing circuit 205 according to Example 2 of the configuration can detect a focus point with higher precision by making the second threshold value Tb in the base clipping circuit 203b changeable and continuously performing an operation of focal-point detection until the maximum value of an integrated value of the integrator 204b falls within the set range (RL to RH).

EXAMPLE 5

Figure 8:
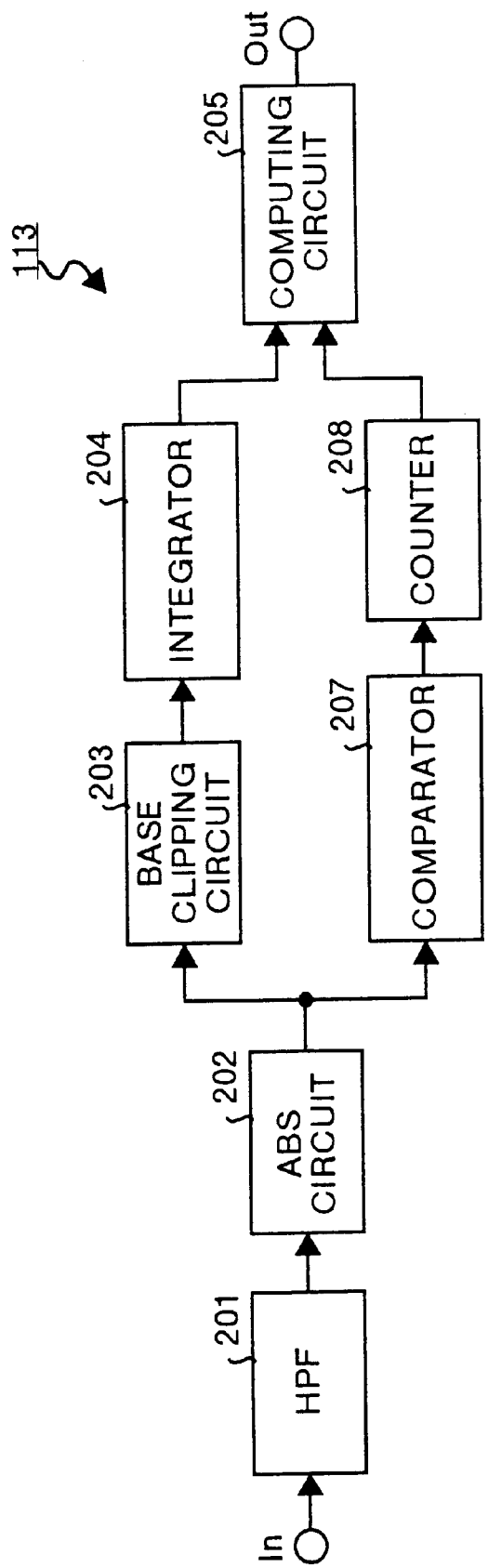
FIG. 8 is a block diagram showing Example 5 of the configuration of the automatic focus-detecting circuit in FIG. 1.
Figure 9A:
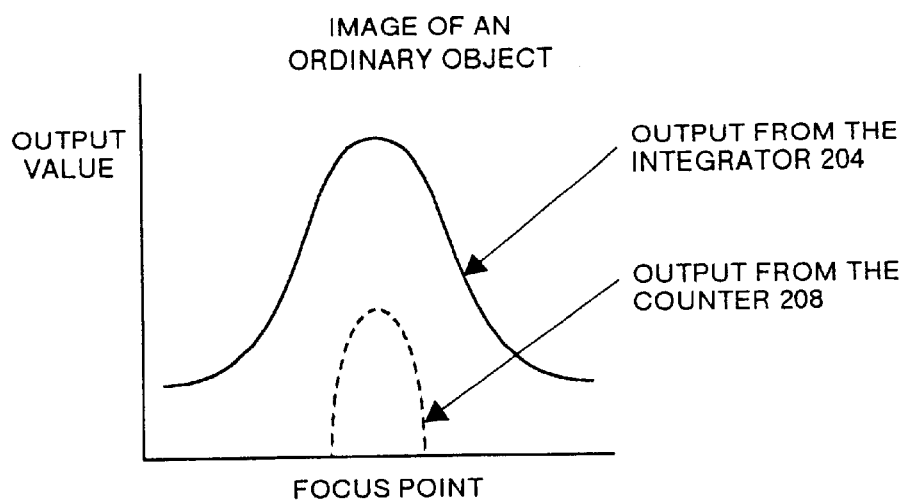
FIG. 9A to FIG. 9C are views each showing output characteristic of an integrator of the automatic focus-detecting circuit in FIG. 4.
Figure 9B:
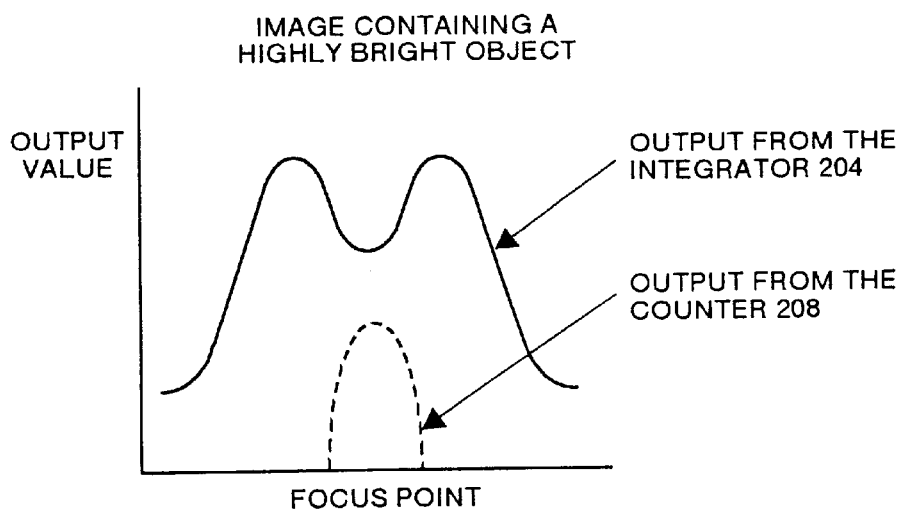
Figure 9C:
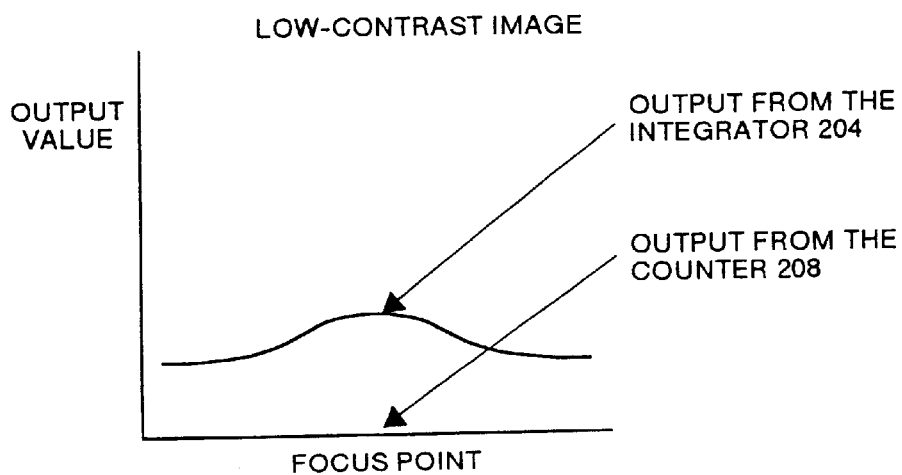

FIG. 8 is a block diagram showing Example 5 of the configuration of the automatic focus-detecting circuit 113. FIG. 9A to FIG. 9C are views each showing output characteristic of an integrator 204 and a counter 208 in the automatic focus-detecting circuit 113 shown in FIG. 8.

In FIG. 8, the reference numeral 201 shows a HPF (High-pass filter) which passes only a high-frequency component included in an input image. The reference numeral 202 shows an ABS circuit (Absolute value circuit) which calculates an absolute value of the output (this output may have a positive or a negative polarity) of the HPF 201. The reference numeral 203 shows a base clipping circuit which removes a component equal to or less than the threshold value Ta from the output of the ABS circuit 202. The reference numeral 207 shows a comparator, which compares the output of the ABS circuit 202 with the threshold value Tb and outputs the data when the output is equal to or higher than the threshold value Tb as a comparison signal. The threshold value Tb in the comparator 207 is set to a larger value than a threshold value Ta of the base clipping circuit 203.

The reference numeral 204 shows an integrator which integrates the output of the base clipping circuit 203 for each image (an image at each lens position). The reference numeral 208 shows a counter which counts the output of the comparator 207. The reference numeral 205 shows a computing circuit, which temporarily stores therein each output of the integrator 204 and counter 208, computes points where each output of the integrator 204 and counter 208 is the maximum, and outputs the point at which output of either the integrator 204 or the counter 208 is the maximum to the CPU 115 as focus point.

Operation of the automatic focus-detecting circuit 113 in FIG. 8 is described below. The HPF 201 extracts a high-frequency component from the input image data and outputs it to the ABS circuit 202. The ABS circuit 202 obtains an absolute value of the output (this output may have a positive or a negative polarity) of the HPF 201, and outputs the data to the base clipping circuit 203 and the comparator 207.

The base clipping circuit 203 removes a component (which is most likely the noise) equal to or less than the threshold value Ta from the output of the ABS circuit 202 and outputs the rest to the integrator 204. The integrator 204 integrates components included in a preset focal-point detection range in the image data output of the base clipping circuit 203 and outputs the integrated value to the computing circuit 205 for each image.

The comparator 207 compares the output of the ABS circuit 202 with the threshold value Tb (Tb>Ta) and outputs the data when the output is equal to or higher than the threshold value Tb as a comparison signal. In the comparison signal output from the comparator 207, a pixel having a value equal to or higher than the threshold value Tb are allocated a logical value of "1". The counter 208 counts components included in the preset focal-point detection range of image data in the comparison signal output from the comparator 207 and outputs the counted value to the computing circuit 205. The counted value represents the number of pixels having a value equal to or higher than the threshold value Tb. Namely, the comparator 207 outputs a number of pixels having a value equal to or higher than the threshold value Tb to the computing circuit 205 as a counted value for each inputted image.

The computing circuit 205 computes points where each output of the integrator 204 and counter 208 at a plurality of points is the maximum, and outputs the point at which output of either the integrator 204 or the counter 208 is the maximum to the CPU 115 as focus point. More specifically, the computing circuit 205 determines a focus point as described below.

For example, when an image of an ordinary object is picked up, changes in each level of outputs of the integrator 204 and counter 208 are as shown in FIG. 9A. In the case of the ordinary object, as shown in this figure, points where each output of the integrator 204 and counter 208 is the maximum are coincident with each other, and the computing circuit 205 outputs the point at which the output is the maximum to the CPU 115 as the focus point.

When an image containing a highly bright object is picked up, changes in each level of outputs of the integrator 204 and counter 208 are as shown in FIG. 9B. Points where each output of the integrator 204 and counter 208 is the maximum are not coincident with each other as shown in the figure. The maximum value of the integrator 204 in this case is obtained under the situation that a light source within a focal-point detection range is defocused to become artificially large, thus the computing circuit 205 outputs the point at which the output of the counter 208 is the maximum to the CPU 115 as the focus point.

Then, when an image having a low-contrast is picked up, changes in each level of outputs of the integrator 204 and counter 208 are as shown in FIG. 9C. The value of the output of the counter 208 is zero as shown in this figure. In this case, the computing circuit 205 outputs the point at which the output of the integrator 204 is the maximum to the CPU 115 as the focus point.

As described above, with Example 5 of the configuration, the base clipping circuit 203 removes a component equal to or less than a first threshold value Ta from the output from the ABS circuit 202 to output the rest, the comparator 207 outputs a comparison signal when the output of the ABS circuit 202 is equal to or higher than the second threshold value Tb which is larger as compared to the first threshold value Ta. Further, the integrator 204 integrates the output of the base clipping circuit 203 to compute an integrated value, the counter 208 counts the output of the comparator 207 to compute a counted value (computed value). Finally, the computing circuit 205 detects a focus point according to the integrated value of the integrator 204 as well as according to the counted value of the counter 208. Therefore, it is possible to detect a focus point with high precision even for an object containing a highly bright object based on simple and small-scale circuit configuration.

EXAMPLE 6

Figure 10:
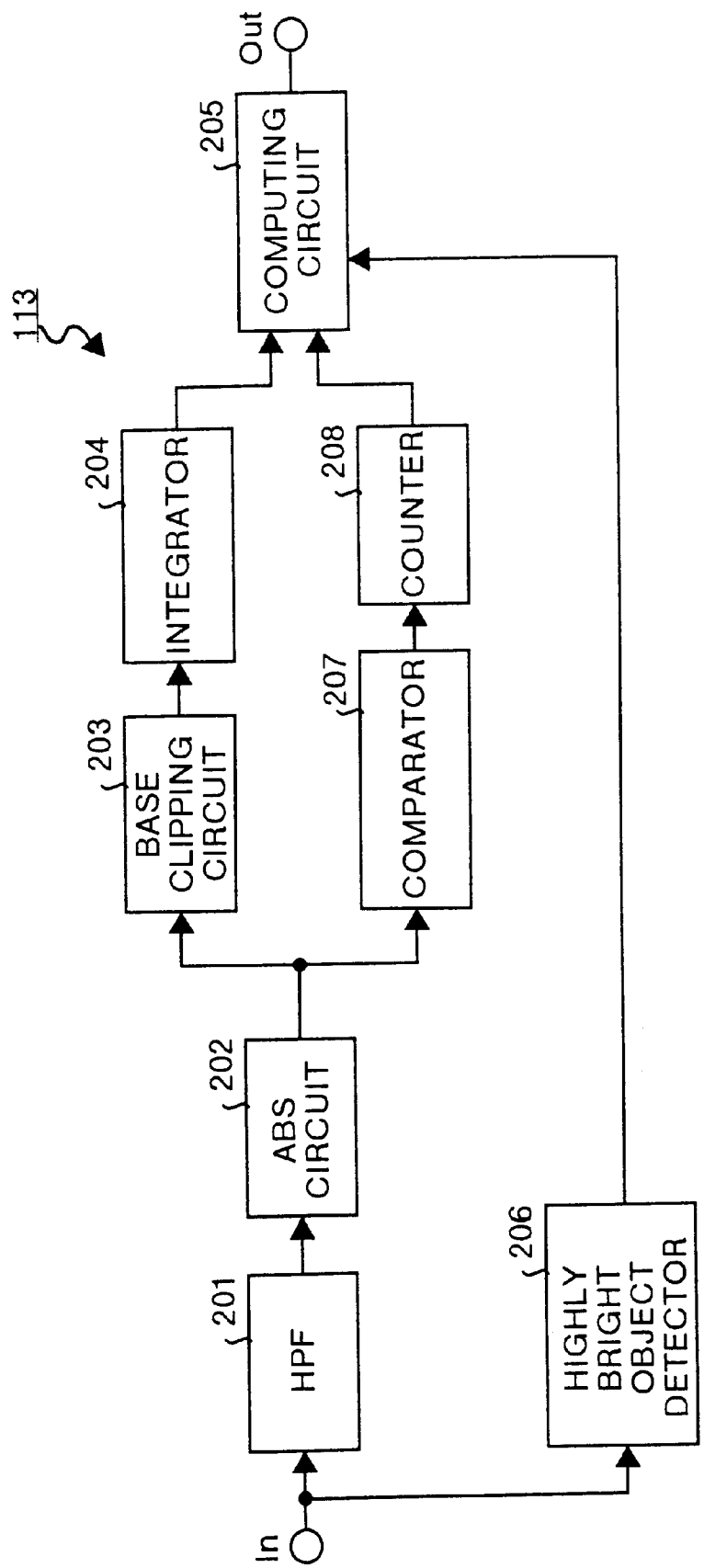
FIG. 10 is a block diagram showing Example 6 of the configuration of the automatic focus-detecting circuit in FIG. 1.

FIG. 10 is a block diagram showing Example 6 of the configuration of the automatic focus-detecting circuit 113.

In FIG. 10, the reference numeral 201 shows a HPF (High-pass filter) which passes only a high-frequency component included in an input image. The reference numeral 202 shows an ABS circuit (Absolute value circuit) which calculates an absolute value of the output (this output may have a positive or a negative polarity) of the HPF 201. The reference numeral 203 shows a base clipping circuit which removes a component equal to or less than the threshold value Ta from the output of the ABS circuit 202. The reference numeral 207 shows a comparator, which compares the output of the ABS circuit 202 with the threshold value Tb and outputs the data when the output is equal to or higher than the threshold value Tb as a comparison signal. The threshold value Tb in the comparator 207 is set to a larger value than a threshold value Ta of the base clipping circuit 203.

The reference numeral 204 shows an integrator which integrates the output of the base clipping circuit 203 for each image (an image at each lens position). The reference numeral 208 shows a counter which counts the output from the comparator 207. The reference numeral 206 shows a highly bright object detector for detecting a high-brightness component included in an input image, which changes an output level, for instance, when a signal at a level higher than a level preset by a comparator is input and maintains the status until an operation of focal-point detection is finished. The reference numeral 205 shows a computing circuit, which temporarily stores the output of the integrator 204 and counter 208, computes focusing points where each output of the integrator 204 and counter 208 is the maximum, and outputs the point at which output of either the integrator 204 or the counter 208 is the maximum according to the output status of the highly bright object detector 206 to the CPU 115 as the focus point.

Operation of the automatic focus-detecting circuit 113 in FIG. 10 is described below. The HPF 201 extracts a high-frequency component from the input image data and outputs it to the ABS circuit 202. The ABS circuit 202 obtains an absolute value of the output (this output may have a positive or a negative polarity) of the HPF 201, and outputs the data to the base clipping circuit 203 and the comparator 207.

The base clipping circuit 203 removes a component (which is most likely the noise) equal to or less than the threshold value Ta from the output of the ABS circuit 202 and outputs the rest to the integrator 204. The integrator 204 integrates components included in a preset focal-point detection range in the image data output of the base clipping circuit 203 and outputs the integrated value to the computing circuit 205 for each image.

The comparator 207 compares the output of the ABS circuit 202 with the threshold value Tb (Tb>Ta) and outputs the data when the output is equal to or higher than the threshold value Tb as a comparison signal. In the comparison signal output from the comparator 207, a pixel having a value equal to or higher than the threshold value Tb are allocated a logical value of "1". The counter 208 counts components included in the preset focal-point detection range of image data in the comparison signal output from the comparator 207 and outputs the counted value to the computing circuit 205. The counted value represents the number of pixels having a value equal to or higher than the threshold value Tb. Namely, the comparator 207 outputs a number of pixels having a value equal to or higher than the threshold value Tb to the computing circuit 205 as a counted value for each inputted image.

The computing circuit 205 computes points where each output of the integrator 204 and counter 208 at a plurality of points is the maximum, and outputs the point at which output of either the integrator 204 or the counter 208 is the maximum to the CPU 115 as the focus point. More specifically, the computing circuit 205 determines a focus point as described below.

For example, when the highly bright object detector 206 can not detect a highly bright object in an input image, namely, when an image of an ordinary object is picked up, changes in each level of outputs of the integrator 204 and counter 208 are as shown in FIG. 9A. In the case of the ordinary object, as shown in the figure, points where each output of the integrator 204 and counter 208 is the maximum are coincident with each other, and the computing circuit 205 outputs the point at which the output is the maximum to the CPU 115 as the focus point.

When the highly bright object detector 206 detects a highly bright object from an input image, changes in each level of outputs of the integrator 204 and counter 208 are as shown in FIG. 9B. When a highly bright object is included in the image, as shown in this figure, points where each output of the integrator 204 and counter 208 is the maximum are not coincident with each other. The maximum value of the integrator 204 in this case is obtained under the situation that a light source within a focal-point detection range is defocused to become artificially large, thus the computing circuit 205 outputs the point at which the output of the counter 208 is the maximum to the CPU 115 as the focus point.

As described above, with Example 6 of the configuration, the base clipping circuit 203 removes a component equal to or less than the first threshold value Ta of the output of the ABS circuit 202 and outputs, the comparator 207 outputs a comparison signal when the output of the ABS circuit 202 is equal to or higher than the second threshold value Tb which is larger as compared to the first threshold value Ta. Further, the integrator 204 integrates the output of the base clipping circuit 203 and computes an integrated value, and the counter 208 counts the output of the comparator 207 and computes a counted value (computed value). Finally, the computing circuit 205 detects a focus point according to the integrated value of the integrator 204, the counted value of the counter 208, and according to the result of detection in the highly bright object detector 206. Therefore, it is possible to detect a focus point with high precision even for an image containing a highly bright object.

EXAMPLE 7

Figure 11:
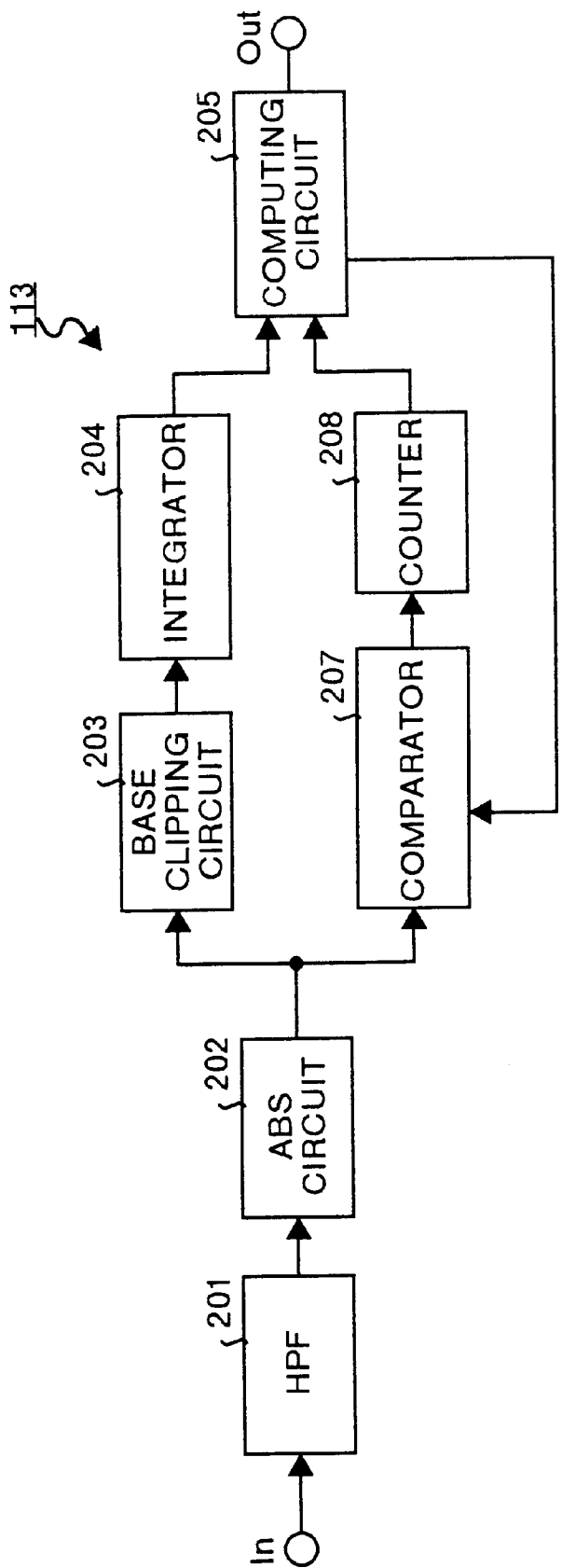
FIG. 11 is a block diagram showing Example 7 of the configuration of the automatic focus-detecting circuit in FIG. 1.

FIG. 11 is a block diagram showing Example 7 of the configuration of the automatic focus-detecting circuit 113. In this figure, the same reference numerals are assigned to the components corresponding to those in FIG. 8. Example 7 of the configuration shown in FIG. 11 is different in a point that the threshold value Tb in the comparator 207 in the configuration (Example 5 of the configuration) of FIG. 8 is controllable by the computing circuit 205.

Namely, in Example 7 of the configuration, when the maximum value of output of the counter 208 is larger than the set value at the time of picking up an image containing a highly bright object, a lower limit of a target for computation of the counter 208 is increased by increasing the threshold value Tb in the counter 208 and the operation of focal-point detection is performed again. Therefore, the precision of focal-point detection is enhanced because of the less influence of the highly bright object over output of the counter 208.

The computing circuit 205 detects a focus point in the same manner as that in the Example 5, in the case of an ordinary object for which points where each output of the integrator 204 and counter 208 is the maximum are coincident with each other, or when the maximum value of output of the counter 208 is smaller than an upper limit RH of a set range (RL to RH) in an image containing a highly bright object in case of which focusing points where each output of the integrator 204 and counter 208 is the maximum are not coincident with each other. Further, if the image is a low-contrast image, then the focus point is determined in the same manner as that in the above mentioned Example 1.

On the contrary, when an image includes a highly bright object in case of which the points where each output of the integrator 204 and counter 208 is the maximum are not coincident with each other and if the maximum value of the output of the counter 208 is larger than the upper limit RH of the set range (RL to RH), the computing circuit 205 increases the threshold value Tb in the comparator 207 and also outputs a retry signal for requesting a retry of focal-point detection to the CPU 115. Namely, precision of focal-point detection is enhanced by making the maximum value of the output of the counter 208 smaller than the upper limit of the set range (RL to RH) by increasing the threshold value Tb in the comparator 207.

A specific example of the operation is explained here. When receiving the retry signal, the CPU 115 makes the related blocks operate to perform the operation of focal-point detection again. The same operation is repeated until the maximum value of output of the counter 208 becomes smaller than the upper limit RH of the set range (RL to RH).

The computing circuit 205 outputs a point at which output of the counter 208 becomes the maximum to the CPU 115 as the focus point when the maximum value of output of the counter 208 becomes smaller than the upper limit RH of the set range (RL to RH) by increasing the threshold value Tb in the comparator 207.

When the maximum value of output of the counter 208 becomes smaller than the lower limit RL of the set range (RL to RH) after increasing the threshold value Tb in the comparator 207, the computing circuit 205 decreases the threshold value Tb in the comparator 207 (an amount of decrease in the threshold value is made smaller than the amount that was increased in the immediately previous step) and also outputs a retry signal for requesting a retry of focal-point detection to the CPU 115.

When receiving such a retry signal, the CPU 115 makes the related blocks operate to perform the operation of focal-point detection again. The same operation is repeated until the maximum value of output of the counter 208 becomes larger than the lower limit RL of the set range (RL to RH).

A method in which the maximum value of the counter 208 is decreased, when the maximum value of output of the counter 208 is greater than the upper limit RH of the set range (RL to RH), by increasing the threshold value Tb in the comparator 207 to operate focal-point detection again and precision of focal-point detection is further enhanced when the maximum value of output of the counter 208 is large is explained.

When the maximum value of the output of the counter 208 is lower than the upper limit RH of the set range (RL to RH), the focus point is detected in the same manner as that of the automatic focus-detecting circuit according to Example 5.

On the contrary, when the maximum value of output of the counter 208 is greater than the upper limit RH of the set range (RL to RH), the computing circuit 205 increases the threshold value Tb in the comparator 207 and also outputs a retry signal for requesting a retry of focal-point detection to the CPU 115.

When receiving such a retry signal, the CPU 115 makes the related blocks operate to perform the operation of focal-point detection again. The same operation is repeated until the maximum value of output of the counter 208 becomes lower than the upper limit RH of the set range (RL to RH).

The computing circuit 205 outputs a point at which output of the counter 208 is the maximum to the CPU 115 as the focus point when the maximum value of output of the counter 208 becomes lower than the upper limit RH of the set range (RL to RH) after increasing the threshold value Tb in the comparator 207.

When the maximum value of output of the counter 208 becomes lower than the lower limit RL of the set range (RL to RH) after increasing the threshold value Tb in the comparator 207, the computing circuit 205 decreases the threshold value Tb in the comparator 207 (an amount of decrease in the threshold value is made smaller than the amount that was increased in the immediately previous step) and also outputs a retry signal for requesting a retry of focal-point detection to the CPU 115. When receiving such a retry signal, the CPU 115 makes the related blocks operate to perform the operation of focal-point detection again. The same operation is repeated until the maximum value of output of the counter 208 becomes greater than the lower limit RL of the set range (RL to RH).

When the maximum value of output of the counter 208 is smaller than the lower limit RL of the set range (RL to RH) even after decreasing the threshold value Tb in the comparator 207 up to a certain value (the lowest limit of the threshold value) different from a set value to the counter 208, the computing circuit 205 outputs the point at which output of the counter 208 is the maximum to the CPU 115 as the focus point.

As described above, with Example 7 of the configuration, the computing circuit 205 according to Example 5 can detect the focus point with higher precision by making the second threshold value Tb in the comparator 207 changeable and continuously performing an operation of focal-point detection until the maximum value of a counted value in the counter 208 falls within the set range (RL to RH).

EXAMPLE 8

Figure 12:
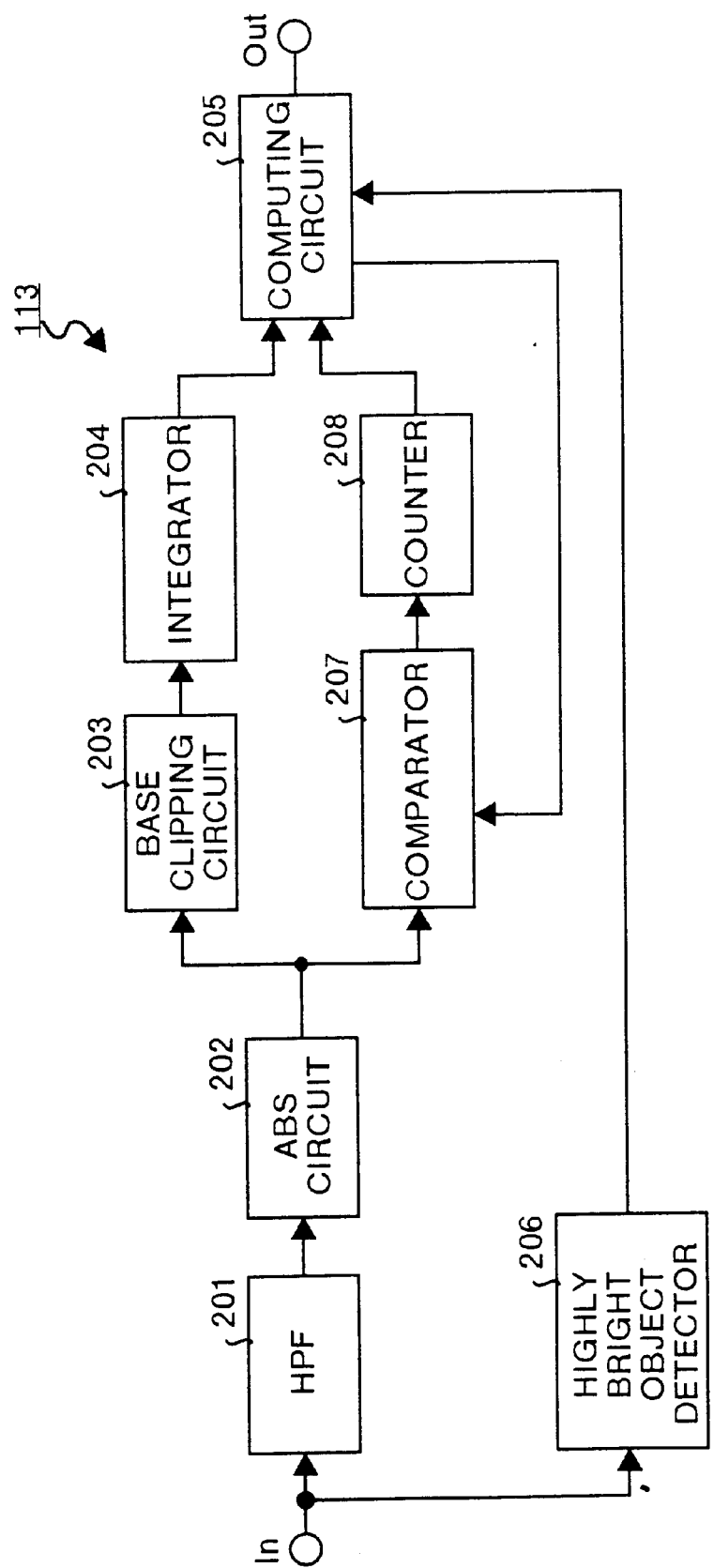
FIG. 12 is a block diagram showing Example 8 of the configuration of the automatic focus-detecting circuit in FIG. 1.
Figure 13:
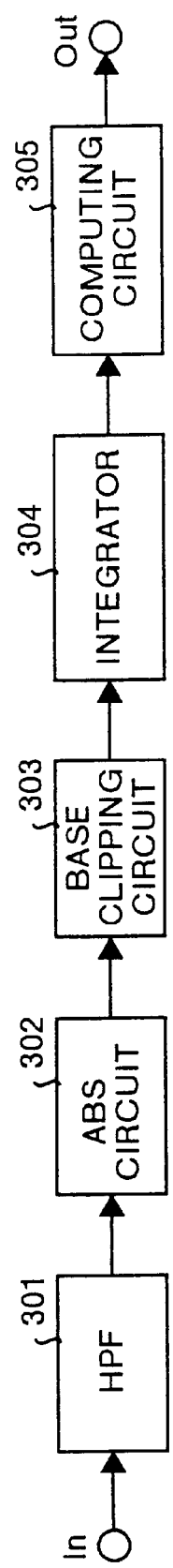
FIG. 13 is a block diagram showing configuration of the automatic focus-detecting circuit based on the conventional technology.

FIG. 12 is a block diagram showing Example 8 of the configuration of the automatic focus-detecting circuit 113. In this figure, the same reference numerals are assigned to the components corresponding to those in FIG. 10. Example 8 shown in FIG. 12 is different in a point that the computing circuit 205 can control the threshold value Tb in the comparator 207 in the Example 6 shown in FIG. 10.

Namely, in Example 8, when the maximum value of the counter 208 is larger than the upper limit RH of a set value (RL to RH) at the time of picking up an image containing a highly bright object, a lower limit of a target for computation of the counter 208 is increased by increasing the threshold value Tb in the comparator 207 and detection of the focal-point is performed again. Therefore, the precision of focal-point detection is enhanced because of the less influence of the highly bright object over output of the counter 208.

When a highly bright object is not detected in the highly bright object detector 206, or when the maximum value of the output of the counter 208 is smaller than the upper limit RH of the set range (RL to RH) even if a highly bright object is detected by the highly bright object detector 206, a focus point is detected in the same manner as that in Example 6.

On the contrary, when a highly bright object is detected by the highly bright object detector 206 and further the maximum value of output of the counter 208 is larger than the upper limit RH of the set range (RL to RH), the computing circuit 205 increases the threshold value Tb in the comparator 207 and also outputs a retry signal for requesting a retry of focal-point detection to the CPU 115.

When receiving such a retry signal, the CPU 115 makes the related blocks operate to perform the operation of focal-point detection again. The same operation is repeated until the maximum value of output of the counter 208 becomes smaller than the upper limit RH of the set range (RL to RH).

Then, the computing circuit 205 outputs a point at which output of the counter 208 is the maximum after increasing the threshold value Tb in the comparator 207 to the CPU 115 as the focus point.

When the maximum value of output of the counter 208 becomes smaller than the lower limit RL of the set range (RL to RH) after increasing the threshold value Tb in the comparator 207, the computing circuit 205 decreases the threshold value Tb in the comparator 207 (an amount of decrease in the threshold value is made smaller than the amount that was increased in the immediately previous step) and also outputs a retry signal for requesting a retry of focal-point detection to the CPU 115. When receiving such a retry signal, the CPU 115 makes the related blocks operate to perform the operation of focal-point detection again. The same operation is repeated until the maximum value of output of the counter 208 becomes larger than the lower limit RL of the set range (RL to RH).

As described above, with Example 8 of the configuration, the computing circuit 205 according to Example 6 can detect the focus point with higher precision by making the second threshold value Tb in the comparator 207 changeable and continuously performing an operation of focal-point detection until the maximum value of a counted value of the counter 208 falls within the set range (RL to RH).

The automatic focus-detecting apparatus according to the present invention is widely applicable to image input equipment with an image pickup device like a video camera or a digital camera.

As described above, according to the first aspect of this invention, the high-frequency component extracting unit extracts the high-frequency component included in the picked-up image, the first clipping unit removes the component equal to or less than the first threshold value from the high-frequency component and outputs the rest of the high-frequency component, the second clipping unit removes the component equal to or less than the second threshold value which is larger than the first threshold value from the high-frequency component and outputs the rest of the high-frequency component, the first integrating unit integrates the output of the first clipping unit, the second integrating unit integrates the output of the second clipping unit, and the computing unit detects the focus point according to the integrated values obtained in the first and the second integrating unit. Therefore, it is possible to provide an automatic focus-detecting circuit which can detect the focus point with high precision even for an object containing a highly bright object based on simple and small-scale circuit configuration.

According to the second aspect of this invention, the high-frequency component extracting unit extracts the high-frequency component included in the picked-up image, the first clipping unit removes the component equal to or less than the first threshold value from the high-frequency component to output the rest of the high-frequency component, the second clipping unit removes the component equal to or less than the second threshold value which is larger than the first threshold value from the high-frequency component to output the rest of the high-frequency component, the first integrating unit integrates the output of the first clipping unit, the second integrating unit integrates the output of the second clipping unit, the highly bright object detecting unit detects the high-brightness component in the picked-up image, and the computing unit detects the focus point according to the integrated values obtained in the first and second integrating unit and the result of detection in the highly bright object detecting unit. Therefore, it is possible to provide an automatic focus-detecting circuit which can detect the focus point with high precision even for a an object containing a highly bright object.

Further, the computing unit according to the first or second aspects of this inventions can change the second threshold value in the second clipping unit. Further, the operation of focal-point detection is continued until the maximum value of the integrated value obtained in the second integrating unit falls within a set range. Therefore, the focus point can be detected with higher precision.

According to the third aspect of this invention, the high-frequency component extracting unit extracts the high-frequency component included in the picked-up image, the clipping unit removes the component equal to or less than the first threshold value from the high-frequency component and outputs the rest of the high-frequency component, a comparing unit outputs the comparison signal when the high-frequency component is equal to or higher than the second threshold value which is larger than the first threshold value, an integrating unit integrates the output of the clipping unit, the counter counts the output of the comparing unit, and the computing unit detects the focus point according to the integrated value obtained in the integrating unit and the counted value obtained in the counting unit. Therefore, it is possible to provide an automatic focus-detecting circuit which can detect the focus point with high precision even for an object containing a highly bright object based on simple and small-scale circuit configuration.

According to the forth aspect of this invention, the high-frequency component extracting unit extracts the high-frequency component included in the picked-up image, the clipping unit removes the component equal to or less than the first threshold value from the high-frequency component and outputs the rest of the high-frequency component, a comparing unit outputs the comparison signal when the high-frequency component is equal to or higher than the second threshold value which is larger than the first threshold value, an integrating unit integrates the output of the clipping unit, the counting unit counts the output of the comparing unit, the highly bright object detecting unit detects the high-brightness component in the picked-up image, and the computing unit detects the focus point according to the integrated value obtained the integrating unit, the counted value obtained in the counting unit, and the result of detection in the highly bright object detecting unit. Therefore, it is possible to provide an automatic focus-detecting circuit which can detect the focus point with high precision even for an image containing a highly bright object.

Further, the computing unit according the third or fourth aspect of this inventions can change the second threshold value in the second comparing unit. Further, the operation of focal-point detection is continued until the maximum value of the counted value obtained in the counting unit falls within the set range. Therefore, the focus point can be detected with higher precision.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An automatic focus-detecting apparatus which detects a focus point according to high-frequency components in images at a plurality of focusing points; said apparatus comprising:

a high-frequency component extracting unit which extracts a high-frequency component included in the picked-up image;

a first clipping unit which removes a component equal to or less than a first threshold value from the high-frequency component and outputs the rest of the high-frequency component;

a second clipping unit which removes a component equal to or less than a second threshold value which is larger than the first threshold value from the high-frequency component and outputs the rest of the high-frequency component;

a first integrating unit which integrates the output of said first clipping unit in order to compute an integrated value; a second integrating unit which integrates the output of said second clipping unit in order to compute an integrated value; and a computing unit which detects the focus point according to a selected one of the integrated values obtained in said first integrating unit and said second integrating unit.

2. The automatic focus-detecting apparatus according to claim 1, wherein said computing unit can change the second threshold value in said second clipping unit, and an operation of focal-point detection is continued until the maximum value of the integrated value obtained in said second integrating unit falls within a set range.

3. An automatic focus-detecting apparatus which detects a focus point according to high-frequency components in images at a plurality of focusing points; said apparatus comprising:

a high-frequency component extracting unit which extracts a high-frequency component included in the picked-up image;

a first clipping unit which removes a component equal to or less than a first threshold value from the high-frequency component and outputs the rest of the high-frequency component;

a second clipping unit which removes a component equal to or less than a second threshold value which is larger than the first threshold value from the high-frequency component to output the rest of the high-frequency component;

a first integrating unit which integrates the output of said first clipping unit in order to compute an integrated value; a second integrating unit which integrates the output of said second clipping unit in order to compute an integrated value;

a highly bright object detecting unit which detects a high-brightness component of the picked-up image; and a computing unit which detects the focus point according to a selected one of the integrated values obtained in said first integrating unit and said second integrating unit and also according to the result of detection in said highly bright object detecting unit.

4. The automatic focus-detecting apparatus according to claim 3, wherein said computing unit can change the second threshold value in said second clipping unit, and an operation of focal-point detection is continued until the maximum value of the integrated value obtained in said second integrating unit falls within a set range.

5. An automatic focus-detecting apparatus which detects a focus point according to high-frequency components in images at a plurality of focusing points; said apparatus comprising:

a high-frequency component extracting unit which extracts a high-frequency component included in the picked-up image;

a clipping unit which removes a component equal to or less than a first threshold value from the high-frequency component and outputs the rest of the high-frequency component;

a comparing unit which outputs a comparison signal when the high-frequency component is equal to or higher than a second threshold value which is larger than the first threshold value; an integrating unit which integrates the output of said clipping unit in order to compute an integrated value;

a counting unit which counts the output of said comparing unit in order to compute a counted value; and a computing unit which detects the focus point according to a selected one of the integrated value obtained in said integrating unit and the counted value obtained in said counting unit.

6. The automatic focus-detecting apparatus according to claim 5, wherein said computing unit can change the second threshold value in said comparing unit, and the operation of focal-point detection is continued until the maximum value of the counted value obtained in said counting unit falls within a set range.

7. An automatic focus-detecting apparatus which detects a focus point according to high-frequency components in images at a plurality of focusing points; said apparatus comprising:

a high-frequency component extracting unit which extracts a high-frequency component included in the picked-up image;

a clipping unit which removes a component equal to or less than a first threshold value from the high-frequency component and outputs the rest of the high-frequency component;

a comparing unit which outputs a comparison signal when the high-frequency component is equal to or higher than a second threshold value which is larger than the first threshold value, an integrating unit which integrates the output of the clipping unit in order to compute an integrated value;

a counting unit which counts the output of said comparing unit in order to compute a counted value;

a highly bright object detecting unit which detects a high-brightness component of the picked-up image; and a computing unit which detects the focus point according to a selected one of the integrated value obtained in said integrating unit and the counted value obtained in said counting unit being selected according to the result of detection in said highly bright object detecting unit.

8. The automatic focus-detecting apparatus according to claim 7, wherein said computing unit can change the second threshold value in said comparing unit, and the operation of focal-point detection is continued until the maximum value of the counted value obtained in said counting unit falls within a set range.

9. An automatic focus-detecting apparatus which detects a focus point according to high-frequency components in images at a plurality of focusing points; said apparatus comprising:

a high-frequency component extracting means for extracting a high-frequency component included in the picked-up image;

a first clipping means for removing a component equal to or less than a first threshold value from the high-frequency component and outputting the rest of the high-frequency component;

a second clipping means for removing a component equal to or less than a second threshold value which is larger than the first threshold value from the high-frequency component and outputting the rest of the high-frequency component;

a first integrating means for integrating the output of said first clipping means in order to compute an integrated value;

a second integrating means for integrating the output of said second clipping means in order to compute an integrated value; and a computing means for detecting the focuspoint according to a selected one of the integrated values obtained in said first integrating means and said second integrating means.

10. The automatic focus-detecting apparatus according to claim 9, wherein said computing means can change the second threshold value in said second clipping means, and an operation of focal-point detection is continued until the maximum value of the integrated value obtained in said second integrating means falls within a set range.

11. An automatic focus-detecting apparatus which detects a focus point according to high-frequency components in images at a plurality of focusing points; said apparatus comprising:

a high-frequency component extracting means for extracting a high-frequency component included in the picked-up image;

a first clipping means for removing a component equal to or less than a first threshold value from the high-frequency component and outputting the rest of the high-frequency component;

a second clipping means for removing a component equal to or less than a second threshold value which is larger than the first threshold value from the high-frequency component to output the rest of the high-frequency component;

a first integrating means for integrating the output of said first clipping means in order to compute an integrated value;

a second integrating means for integrating the output of said second clipping means in order to compute an integrated value;

a highly bright object detecting means for detecting a high-brightness component of the picked-up image; and a computing means for detecting the focus point according to a selected one of the integrated values obtained in said first integrating means and said second integrating means being selected according to the result of detection in said highly bright object detecting means.

12. The automatic focus-detecting apparatus according to claim 11, wherein said computing means can change the second threshold value in said second clipping means, and an operation of focal-point detection is continued until the maximum value of the integrated value obtained in said second integrating means falls within a set range.

13. An automatic focus-detecting apparatus which detects a focus point according to high-frequency components in images at a plurality of focusing points; said apparatus comprising:

a high-frequency component extracting means for extracting a high-frequency component included in the picked-up image;

a clipping means for removing a component equal to or less than a first threshold value from the high-frequency component and outputting the rest of the high-frequency component;

a comparing means for outputting a comparison signal when the high-frequency component is equal to or higher than a second threshold value which is larger than the first threshold value;

an integrating means for integrating the output of said clipping means in order to compute an integrated value;

a counting means for counting the output of said comparing means in order to compute a counted value; and a computing means for detecting the focus point according to a selected one of the integrated value obtained in said integrating means and the counted value obtained in said counting means.

14. The automatic focus-detecting apparatus according to claim 13, wherein said computing means can change the second threshold value in said comparing means, and the operation of focal-point detection is continued until the maximum value of the counted value obtained in said counting means falls within a set range.

15. An automatic focus-detecting apparatus which detects a focus point according to high-frequency components in images at a plurality of focusing points; said apparatus comprising:

a high-frequency component extracting means for extracting a high-frequency component included in the picked-up image;

a clipping means for removing a component equal to or less than a first threshold value from the high-frequency component and outputting the rest of the high-frequency component;

a comparing means for outputting a comparison signal when the high-frequency component is equal to or higher than a second threshold value which is larger than the first threshold value, an integrating means for integrating the output of the clipping means in order to compute an integrated value;

a counting means for counting the output of said comparing means in order to compute a counted value;

a highly bright object detecting means for detecting a high-brightness component of the picked-up image; and a computing means for detecting the focuspoint according to a selected one of the integrated value obtained in said integrating means, and the counted value obtained in said counting means selected according to the result of detection in said highly bright object detecting means.

16. The automatic focus-detecting apparatus according to claim 15, wherein said computing means can change the second threshold value in said comparing means, and the operation of focal-point detection is continued until the maximum value of the counted value obtained in said counting means falls within a set range.

17. An automatic focus-detecting method which detects a focus point according to high-frequency components in images at a plurality of focusing points; said apparatus comprising:

a high-frequency component extracting step for extracting a high-frequency component included in the picked-up image;

a first clipping step for removing a component equal to or less than a first threshold value from the high-frequency component and outputting the rest of the high-frequency component;

a second clipping step for removing a component equal to or less than a second threshold value which is larger than the first threshold value from the high-frequency component and outputting the rest of the high-frequency component;

a first integrating step for integrating the output of said first clipping step in order to compute an integrated value;

a second integrating step for integrating the output of said second clipping step in order to compute an integrated value; and a computing step for detecting the focus point according to a selected one of the integrated values obtained in said first integrating step and said second integrating step.

18. The automatic focus-detecting method according to claim 17, wherein said computing step can change the second threshold value in said second clipping step, and an operation of focal-point detection is continued until the maximum value of the integrated value obtained in said second integrating step falls within a set range.

19. An automatic focus-detecting method which detects a focus point according to high-frequency components in images at a plurality of focusing points; said apparatus comprising:

a high-frequency component extracting step for extracting a high-frequency component included in the picked-up image;

a first clipping step for removing a component equal to or less than a first threshold value from the high-frequency component and outputting the rest of the high-frequency component;

a second clipping step for removing a component equal to or less than a second threshold value which is larger than the first threshold value from the high-frequency component to output the rest of the high-frequency component;

a first integrating step for integrating the output of said first clipping step in order to compute an integrated value;

a second integrating step for integrating the output of said second clipping step in order to compute an integrated value;

a highly bright object detecting step for detecting a high-brightness component of the picked-up image; and a computing step for detecting the focus point according to a selected one of the integrated values obtained in said first integrating step and said second integrating step being selected according to the result of detection in said highly bright object detecting step.

20. The automatic focus-detecting method according to claim 19, wherein said computing step can change the second threshold value in said second clipping step, and an operation of focal-point detection is continued until the maximum value of the integrated value obtained in said second integrating step falls within a set range.

21. An automatic focus-detecting method which detects a focus point according to high-frequency components in images at a plurality of focusing points; said apparatus comprising:

a high-frequency component extracting step for extracting a high-frequency component included in the picked-up image;

a clipping step for removing a component equal to or less than a first threshold value from the high-frequency component and outputting the rest of the high-frequency component;

a comparing step for outputting a comparison signal when the high-frequency component is equal to or higher than a second threshold value which is larger than the first threshold value;

an integrating step for integrating the output of said clipping step in order to compute an integrated value;

a counting step for counting the output of said comparing step in order to compute a counted value; and a computing step for detecting the focus point according to a selected one of the integrated value obtained in said integrating step and the counted value obtained in said counting step.

22. The automatic focus-detecting method according to claim 21, wherein said computing step can change the second threshold value in said comparing step, and the operation of focal-point detection is continued until the maximum value of the counted value obtained in said counting step falls within a set range.

23. An automatic focus-detecting method which detects a focus point according to high-frequency components in images at a plurality of focusing points; said apparatus comprising:

a high-frequency component extracting step for extracting a high-frequency component included in the picked-up image;

a clipping step for removing a component equal to or less than a first threshold value from the high-frequency component and outputting the rest of the high-frequency component;

a comparing step for outputting a comparison signal when the high-frequency component is equal to or higher than a second threshold value which is larger than the first threshold value, an integrating step for integrating the output of the clipping step in order to compute an integrated value;

a counting step for counting the output of said comparing step in order to compute a counted value;

a highly bright object detecting step for detecting a high-brightness component of the picked-up image; and a computing step for detecting the focus point according to a selected one of the integrated value obtained in said integrating step and the counted value obtained in said counting step being selected according to the result of detection in said highly bright object detecting step.

24. The automatic focus-detecting method according to claim 23, wherein said computing step can change the second threshold value in said comparing step, and the operation of focal-point detection is continued until the maximum value of the counted value obtained in said counting step falls within a set range.

* * * * *